Geo. W. Clark.

PITMAN COUPLING.

No. 71853

PATENTED
DEC 10 1867

INVENTOR.

Attest.
J. H. Layman

United States Patent Office.

GEORGE W. CLARK, OF MANCHESTER, INDIANA.

Letters Patent No. 71,853, dated December 10, 1867.

---

IMPROVEMENT IN PITMAN-COUPLING.

---

*The Schedule referred to in these Letters Patent and making part of the same.*

---

TO WHOM IT MAY CONCERN:

Be it known that I, GEORGE W. CLARK, of Manchester, Dearborn county, Indiana, have invented a new and useful Pitman-Coupling; and I do hereby declare the following to be a full, clear, and exact description thereof, reference being had to the accompanying drawings, making part of this specification.

My invention relates to a form of joint or coupling for pitmen which enables them to be set up or adjusted so as to work with the greatest accuracy consistent with freedom of motion, and is especially designed for the couplings of harvester-pitmen with the crank and sickle-bar.

A represents a portion of a harvester-pitman. B represents a portion of the sickle-bar, having a heel, C, traversed longitudinally by a hooked bolt, D, whose screw-threaded shank E is provided with one or more nuts, F F'. The pitman terminates in two prongs, G G', connected by a bolt, H, which bolt, being engaged in the hook D and in a notch, C, in the heel of the sickle-bar, is firmly secured in said hook and notch by means of the nuts F F'. When it is desired to unship the sickle-bar it is only necessary to slacken the nuts F F', remove the bolt H, and draw the bar out of the guides.

Figure 1:
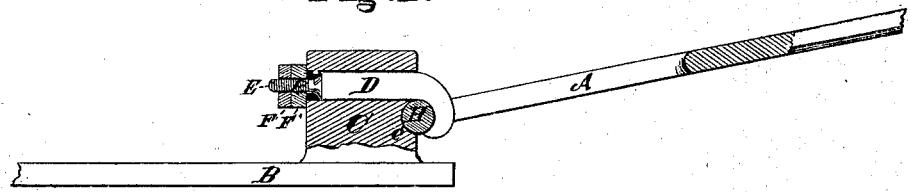
Figure 1 is a longitudinal section of the preferred form of my invention.
Figure 2:
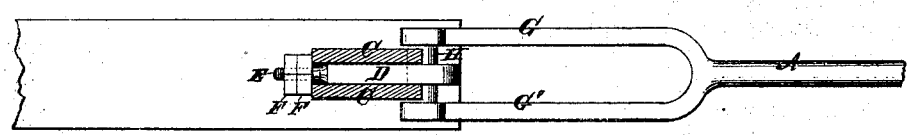
Figure 2 is a horizontal section thereof.
Figure 3:
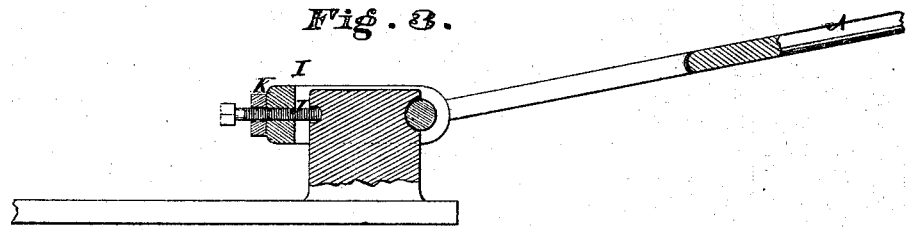
Figure 3 is a longitudinal section of a modification of my invention.
Figure 4:
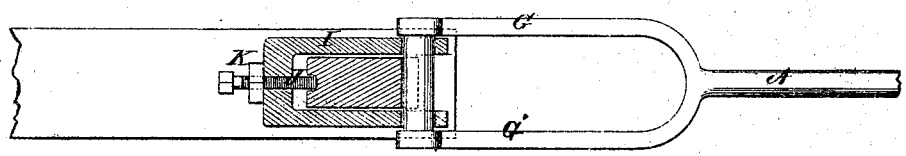
Figure 4 is a horizontal section thereof.

An inferior modification of my invention is seen at figs. 3 and 4, in which the hooked bolt is replaced by a clevis, I, which encloses the heel, a bolt, J, and lock-nut, K, taking the place of the nuts F F'.

I claim herein as new, and of my invention—

The arrangement of forked pitman A, G G', bolt H, screw-shanked hook D, and nuts F F', or their equivalents, substantially as and for the purpose set forth.

In testimony of which invention, I hereunto set my hand.

GEO. W. CLARK.

Witnesses:
GEO. H. KNIGHT,
JAMES H. LAYMAN.